Patented May 22, 1934

1,959,750

UNITED STATES PATENT OFFICE 1,959,750

PROCESS OF EXTRACTING PROTEOLYTIC ENZYMES FROM FIGS, MULBERRIES, PAPAYAS, PINEAPPLES, AND BANANAS

Chyosaku Wada, Tokyo, Japan, assignor to Mataemon Masuda, Tokyo, Japan

No Drawing. Application January 13, 1932, Serial No. 586,462. Renewed October 19, 1933. In Japan January 17, 1931

1 Claim. (Cl. 195—32)

This invention is a process of extracting a powerful proteolytic enzyme from the fruit and other parts of the fig, mulberry, papaya, pineapple or banana.

The object of this invention is to easily obtain a proteolytic ferment or enzyme which can be used extensively and in great many ways by completely removing all the volatile oily elements contained in the materials above-mentioned.

The object of this invention is, moreover, to produce a resolvent ferment for animal and vegetable albumen which may be used mainly for resolving and liquefying albuminous digesters, and culinary seasoning materials softening albuminous substances and which has the effect of turning the said albuminous materials into amino-peptide acid.

To describe the process, a milky substance obtained by pressing the branches, stalks, and fruits of the fig, mulberry, papaya, pineapple or banana is allowed to stand till the impure and insoluble matters settle, after which the layer of the clarified liquid is separated. The said liquid increases in alkalization with the progress of time, so that the liquid is rendered completely alkaline during the next operation which is the condensation of the liquid under reduced pressure and at a low heat. But the above operation extremely weakens the enzymic strength and to counteract which, the liquid is slightly acidified by treating it with acetic acid which is best suited to the fermenting strength. The evaporation of the liquid at a low temperature and with a reduced pressure as aforesaid still continues until its consistency is that of a syrup (not less than 30 degrees, Baumé), when a quantity of acetone equal to the quantity of the syrup is added thereto when a white precipitate is formed and all the volatile oily elements are dispersed in the acetone layer. The material is now allowed to stand for twenty four hours after which the said white precipitate is separated. It is washed with methyl alcohol, thereby removing all the moisture-absorbing matter, and then dried. The result is a proteolytic enzyme of a white colour. The acetone used in the process described far surpasses other fat-solvents such as ethyl alcohol, ether &c. in its power of removing the volatile oily elements in fig, mulberry, papaya, pineapple or banana. As compared with the process of precipitating the proteolytic enzyme by means of ethyl alcohol, there is not only an economy in the use of acetone as the object is perfectly attained with a less quantity of it, than with alcohol. Further, there is a great facility in recovering the acetone used which is an important fact. Moreover, it is noteworthy that in a proteolytic enzyme obtained by methods generally known, such as abovementioned, that is to say, by alcohol, ethyl, ether, &c. the volatile oily elements contained in the material which has so strong an irritating odor as to restrain or obstruct enzyme and animal cell-lives could not be removed from the ferments obtained by the methods hitherto generally known such as above mentioned, that is to say, by using alcohol, ether etc. and that the present invention removes the said defect by producing a harmless and odor-less proteolytic enzyme of a high value. Still, another advantage in the present invention is that an enzyme of non-absorbent moisture can be produced while the enzymes made by hitherto known methods cannot be pulverized and preserved long without loss of strength on account of the moisture-absorbing property remaining in the product due to the existence of volatile oily elements therein.

The proteolytic enzyme of the present invention is comparatively strong in its albumen resolving effect; especially powerful at thirty seven degrees C. and at a hydrogen ion concentration between four and five pH.

It is to be noted that the raw materials used in the application of the invention are, as a matter of course, not limited to fig, mulberry, papaya, pineapple or banana but those materials having the same ingredients as the said materials can also be used, of which fig-fruits when used are preferably those in green and unripe condition as a greater quantity is contained in them.

What I claim is:

The process of extracting proteolytic enzymes from the fruit and other parts selected from the group of the fig, mulberry, papaya, pineapple or banana, which consists in pressing the material to a milky consistency, allowing the same to stand until the solid portions settle and a clarified liquid is obtained, separating the clarified liquid from the mass, rendering the same weakly acid and evaporating the same under a lower temperature and reduced pressure, forming a precipitate by the addition of acetone, allowing the same to stand until the precipitate settles, separating the precipitate, washing the same in methyl alcohol and allowing the product to dry.

CHYOSAKU WADA.